(12) United States Patent
Bogicevic et al.

(10) Patent No.: US 8,337,799 B2
(45) Date of Patent: Dec. 25, 2012

(54) PROCESS FOR MANUFACTURING CARBON COATED NANOPARTICLES OF A TRANSITION METAL OXIDE

(75) Inventors: Christine Bogicevic, Meudon (FR); Fabienne Karolak, Fresnes (FR); Gianguido Baldinozzi, Antony (FR); Mickael Dollé, Toulouse (FR); Dominique Gosset, Bourg la Reine (FR); David Simeone, Massy (FR)

(73) Assignees: Commissariat a l'Energie Atomique-CEA, Paris (FR); Ecole Centrale de Paris-ECP, Chatenay-Malabry (FR); Centre National de la Recherche Scientifique (CNRS), Paris Cedex (FR)

( * ) Notice: Subject to any disclaimer, the term of this patent is extended or adjusted under 35 U.S.C. 154(b) by 237 days.

(21) Appl. No.: 12/663,352

(22) PCT Filed: Jun. 6, 2008

(86) PCT No.: PCT/FR2008/000765
§ 371 (c)(1),
(2), (4) Date: Jun. 21, 2010

(87) PCT Pub. No.: WO2009/004187
PCT Pub. Date: Jan. 8, 2009

(65) Prior Publication Data
US 2010/0202956 A1 Aug. 12, 2010

(30) Foreign Application Priority Data
Jun. 6, 2007 (FR) ..................................... 07 04031

(51) Int. Cl.
*C01B 31/30* (2006.01)
(52) U.S. Cl. ........ 423/439; 423/220; 423/274; 423/608; 423/609; 423/610; 423/594.17; 977/775; 428/403

(58) Field of Classification Search ............... 423/593.1, 423/598, 594.12, 594.17, 608–610, 220, 423/274, 439, 594.8; 427/225.25, 901; 977/773, 977/775; 428/403
See application file for complete search history.

(56) References Cited

U.S. PATENT DOCUMENTS
2009/0004098 A1* 1/2009 Schmidt et al. ............... 423/608

OTHER PUBLICATIONS

Dolle et al. "Synthesis of nanosized zirconium carbide by a sol-gel route" Journal of the European Ceramic Society. 27 (4). Dec. 2004, 2061-2067.*

* cited by examiner

*Primary Examiner* — Steven Bos
*Assistant Examiner* — Richard M Rump
(74) *Attorney, Agent, or Firm* — Browdy and Neimark, PLLC

(57) ABSTRACT

The invention relates to a method for producing nanoparticles of at least one oxide of a transition metal selected from Ti, Zr, Hf, V, Nb and Ta, which are coated with amorphous carbon, wherein said method includes the following successive steps: (i) a liquid mixture containing as precursors at least one alkoxyde of the transition metal, an alcohol, and an acetic acid relative to the transition metal is prepared and diluted in water in order to form an aqueous solution, the precursors being present in the solution according to a molar ratio such that it prevents or sufficiently limits the formation of a sol so that the aqueous solution can be freeze-dried, and such that the transition metal, the carbon and the oxygen are present in a stoichiometric ratio according to which they are included in the nanoparticles; (ii) the aqueous solution is freeze-dried; (ii) the freeze-dried product obtained during the preceding step is submitted to pyrolysis under vacuum or in an inert atmosphere in order to obtain the nanoparticles. The invention also relates to the application of the method for producing transition metal carbide.

18 Claims, No Drawings

PROCESS FOR MANUFACTURING CARBON COATED NANOPARTICLES OF A TRANSITION METAL OXIDE

FIELD OF THE INVENTION

The present invention pertains to the field of transition metal-base nanomaterials which may enter into the composition of elements in nuclear reactors. In particular, it relates to a process for manufacturing carbon-coated nanoparticles of at least one transition metal oxide.

STATE OF THE ART

Transition metal carbides are materials which are particularly well suited to the manufacture of certain elements of next generation nuclear reactors (in particular, the so-called 4th generation reactors) because of their highly refractory character, good thermal conductivity, low neutron absorption, small absorption cross-section and good radiation resistance.

Conversely, they exhibit brittleness, which is prejudicial for such applications.

It has been proposed to reduce this brittleness by decreasing the size of the crystallites of such carbides down to a mean size typically ranging between a few nanometers and a few hundreds of nanometers, in order to form nanocrystallites.

These may be obtained through carbothermal reduction of particles of transition metal oxides coated with amorphous carbon, having a mean size in the range between a few nanometers and a few hundreds of nanometers (these being referred to as "oxide nanoparticles" in the following description). This reduction should be as complete as possible so that the transition metal carbide nanocrystallites are as free of impurities as possible.

For that purpose, the carbothermal reduction is mostly carried out at a high temperature, which must be even higher when the crystallites in the oxide nanoparticles have a larger mean size and/or initially contain a larger amount of impurities.

However, even though the use of a very high temperature effectively allows transition metal carbide crystallites to be obtained which exhibit an appropriate level of purity, this has the drawback of greatly increasing their mean size, or of resulting in the formation of a coarse powder.

Therefore, it is often required, as a last step, to grind this powder in an attempt to reduce the mean size of the crystallites it is comprised of. Such grinding must be performed under an inert atmosphere (most often within a glove box) to prevent oxidation of the carbides. However, this has the drawback of inducing pollution with the grinder materials and, at best, of resulting only in the production of crystallites of transition metal carbides having a mean size in the range of one micron.

In order to carry out carbothermal reduction at temperatures lower than those of existing processes, a new approach for synthesizing zirconium oxide nanoparticles has been proposed in "Dollé et al., Journal of the European Ceramic Society, Vol. 27, N° 4, 2007, pp. 2061-2067". The first step of this synthesis is a sol-gel reaction during which sucrose is dissolved in acetic acid, and zirconium n-propoxide is then added so as to form a viscous gel. Drying and pyrolysis of the thus obtained gel then lead to oxide nanoparticles having a mean size of 15 nm, which are aggregated, into agglomerates with a mean size of 2 to 3 μm. After carbothermal reduction of these oxide nanoparticles at 1400° C., zirconium carbide nanocrystallites are obtained, which, although they have a relatively small mean size (of the order of 93 nm), nevertheless contain impurities.

In the sense of the following description, these impurities are assumed to consist, in particular, of free carbon, dissolved oxygen and oxycarbides.

In an attempt to increase their purity level, such zirconium carbide nanocrystallites, in turn, are heated to a high temperature of 1600° C., with the resulting detrimental consequence of increasing their mean size to 150 nm without, however, succeeding in entirely removing the impurities.

SUMMARY OF THE INVENTION

It is accordingly one of the objects of the present invention to provide a process for manufacturing oxide nanoparticles with the smallest possible mean size, such nanoparticles allowing, after carbothermal reduction at a moderate temperature, transition metal carbide nanocrystallites to be obtained with a higher degree of purity and/or a smaller mean size than nanoparticles obtained by the best existing processes, in particular those of the sol-gel type.

Therefore, an object of the present invention is to provide a process for manufacturing nanoparticles of at least one oxide of a transition metal selected from the group consisting of Ti, Zr, Hf, V, Nb and Ta, which are coated with amorphous carbon, the process comprising the following consecutive steps:

(i) preparing a liquid mixture containing as precursors at least one alkoxide of the transition metal, an alcohol, acetic acid in excess with respect to the transition metal, and then diluting the mixture in water so as to form an aqueous solution, the precursors being present in the aqueous solution in a molar ratio such as to prevent or sufficiently restrict the formation of a sol so that the aqueous solution can be lyophilized, and such that the transition metal, the carbon and the oxygen are present in the stoechiometric ratio in which they are found in the nanoparticles, (ii) subjecting the aqueous solution to lyophilization, (iii) pyrolyzing the lyophilizate obtained in the previous step under vacuum or an inert atmosphere so as to obtain the nanoparticles.

According to the present invention, the transition metal oxide nanoparticles are said to be "coated" with amorphous carbon in the sense that their surface is partially or totally covered with amorphous carbon. The carbon, in turn, is said to be "amorphous" because it is essentially, or mostly, not in the form of crystallites, although a short-range atomic order may exist locally.

Preferably, lyophilization comprises spraying the aqueous solution into a liquid nitrogen bath so as to obtain frozen particles having the homogeneous composition of this solution, and then depressurizing these particles in order to remove water therefrom by sublimation, whereby a powder is obtained which, after additional drying, results in the lyophilizate. According to the present invention, by "homogeneous composition", is meant a composition, which is the same or essentially the same in any micron-size, and preferably nanometer-size volume.

Spraying can be carried out using a wide variety of sprayers, for example a nozzle sprayer or an ultrasound sprayer.

To obtain oxide nanoparticles having the highest possible degree of purity, preferably, the lyophilizate does not contain any other element than the transition metal, carbon, hydrogen or oxygen. To this end, the alkoxide is advantageously selected from the group consisting of isopropoxide and n-propoxide.

Alkoxides comprising different transition metals may also be mixed in order to form nanoparticles containing a mixture of the corresponding oxides, for example a mixture of Ti oxides and Zr oxides.

The alcohol acts, in particular, as a diluting agent for alkoxide. It may be selected from the group consisting of isopropanol (or 2-propanol) and 1-propanol, since these alcohols comprise carbon chains belonging to the same family as those of the above mentioned preferred alkoxides.

Acetic acid, for its part, is a chemical modifier which enables, within the metal alkoxide, the substitution of alkoxy groups with acetate groups. Advantageously, it therefore provides a modified alkoxide which, compared with the starting alkoxide, has a reduced reactivity with water, thus preventing or restricting a spontaneous condensation reaction (sol-gel reaction) of the alkoxide, which reaction may result in the formation of precipitates. When this reaction occurs to a limited extent only, sol formation may then begin because of the initiation of the sol-gel reaction, this sol being such, in the sense of the present invention, that it comprises oligomers and/or colloids suspended in water.

Moreover, in order to prevent or restrict the formation of a sol, leading, in particular, to an aqueous solution with such a high viscosity that it could not be lyophilized and/or to an aqueous solution whose composition would have little homogeneity, the acetic acid, which also acts to reduce the viscosity of the solution, is present in excess relative to the alkoxide and alcohol. One skilled in the art can consider, for example, that an aqueous solution according to the present invention, which meets these criteria, is a clear solution. This is one of the essential features of the process according to the present invention, because the fact that the precursors of the oxide nanoparticles (namely the transition metal alkoxide, acetic acid, alcohol and, if appropriate, the carbon compound) are, for example, in the form of a clear aqueous solution, guarantees a homogeneous distribution of these precursors at a molecular level and as a consequence promotes a homogeneous composition of the oxide nanoparticles.

As a general rule, it is convenient to use an aqueous solution with the smallest possible concentration, given that, all things being equal, a reduction in the concentration of the solution causes a reduction in the mean size of the oxide nanoparticles obtained according to the process of the present invention. Theoretically, although there is no lower limit to the solution concentration, it is generally preferable, in particular for economical reasons, not to use too small a concentration for a solution, in order to reduce implementation costs.

Therefore, preferably, the transition metal concentration in the aqueous solution is 0.1 mole/l or less, more preferably, in the range between 0.001 and 0.1 mole/l, and still more preferably, in the range between 0.01 and 0.1 mole/l. These concentration values have the particular advantage of preventing or limiting any aggregation of the particles present in the form of a sol. They also provide an aqueous solution which is easily lyophilized by means of conventional freeze dryers, since the triple point of the solution is then not too different from that of pure water.

Still with the aim of reducing the mean size of the oxide nanoparticles to the greatest extent possible, the frozen particles obtained during lyophilization may have a mean size in the range between 0.1 µm and 10 µm, preferably less than 2 µm, and still more preferably, in the range between 0.5 µm and 1 µm.

In the following description, by "mean size", is meant the mean value of the diameters of the considered objects (oxide nanoparticles, transition metal carbide nanocrystallites, . . . ) when these are substantially spherical, or the mean value of the main dimensions of such objects when they are not substantially spherical.

To achieve the above-mentioned goal, preferably, the aqueous solution may be sprayed into liquid nitrogen contained in a Dewar vessel and/or spraying is carried out by means of a sprayer which comprises a spray nozzle with a calibrated opening, for example a 0.51 mm calibrated opening, through which the aqueous solution is injected at a pressure in the range between 0.03 and 0.4 MPa, preferably at a pressure of 0.3 MPa, generally under the effect of a carrier gas which may be compressed air, or also a neutral industrial gas, advantageously filtered, such as argon or nitrogen.

According to a preferred embodiment, the aqueous solution may be rotationally driven within the spray nozzle by means of a grooved conical insert. This conical insert causes, through a centrifugal effect, the aqueous solution to impact the internal wall of the nozzle before this solution is injected through the outlet opening. This generally leads to a liquid jet which is in the form of an axially hollow cone with a turbulence effect.

Lyophilization may be carried out in any type of conventional freeze dryer. In this step, the prevailing conditions are not critical, but preferably the particles should be maintained in a frozen state until water removal, in particular in order to avoid interparticle agglomeration phenomena.

Also, it is mostly preferred that the conditions used in this step eventually result in a substantial removal of water, in particular to prevent the occurrence of porosity within the oxide nanoparticles when pyrolyzing the lyophilizate. For that purpose, lyophilization is preferably carried out between −200° C. and +50° C. and more preferably, between −20° C. and +30° C., and at a pressure in the range between 0.1 Pa and 100 Pa, and more preferably, at 10 Pa or less. Thus, for lyophilization to occur efficiently and as rapidly as possible, it may be carried out, for example, at a temperature of the order of −20° C. and at a pressure of the order of 0.1 Pa.

The lyophilization step may advantageously comprise a step of removing the adsorbed water, which consists in maintaining the lyophilizate under the lyophilization pressure, preferably at 0.1 Pa, and then increasing the temperature up to a value which lies preferably in the range between 30° C. and 100° C., and more preferably, is equal to 30° C.

The lyophilizate derived from the aqueous solution provides the precursors in a form which has several characteristics:
  the lyophilizate has a homogeneous composition throughout its volume, in particular because lyophilization is a process which allows water to be removed without inducing any concentration gradient within the solution,
  the lyophilizate is finely divided, thus increasing its reactivity, for instance, with respect to a thermal treatment, and also has the further advantage that it can be handled in the open atmosphere, so that oxide nanoparticles having a reduced mean size can be obtained.

Thus, the mean size of the transition metal oxide crystallites (which is considered to be equivalent to the mean size of the oxide nanoparticles) generally ranges between 10 and 100 nm, preferably between 10 and 50 nm, and still more preferably, between 10 and 20 nm.

Advantageously, the characteristics of the lyophilizate are such that, after pyrolysis, oxide nanoparticles are obtained whose properties are such that they can undergo as complete a carbothermal reduction as possible in order to obtain transition metal carbide nanocrystallites having a reduced mean size and a high degree of purity, without requiring the use of high temperatures.

Moreover, it is essential that the step of pyrolyzing the lyophilizate be carried out i) under vacuum or an inert atmosphere so as to prevent the formation of byproducts such as oxycarbides and ii) at a temperature permitting crystallization of the oxide nanoparticles without at the same time resulting, through carbothermal reduction, in the formation of undesirable carbide nanocrystallites at this stage of the oxide nanoparticle manufacturing process. This temperature most often ranges between 400° C. and 900° C., preferably between 400° C. and 600° C., and still more preferably, between 400° C. and 450° C.

The present invention also relates to the application of the process for manufacturing oxide nanoparticles in order to obtain a transition metal carbide in the form of nanocrystallites, by subjecting the nanoparticles to carbothermal reduction at a later stage or in continuity with said process.

This carbothermal reduction may be carried out in continuity with the process for manufacturing oxide nanoparticles in the sense that the lyophilizate is subjected to only one thermal treatment which comprises both pyrolysis (to form the oxide nanoparticles), and directly after that, carbothermal reduction. It may also be subsequent in the sense that the lyophilizate is subjected to a first thermal treatment under an inert atmosphere, as the pyrolysis step, and the oxide nanoparticles thus obtained are later subjected to a second thermal treatment, as the carbothermal reduction step.

Advantageously, the carbon, oxygen and transition elements required for the formation of oxide nanoparticles may be introduced through the alkoxide, the acetic acid and the alcohol alone. These contributions can be determined beforehand by computation on the basis of the chemical formula of the precursors and/or after thermogravimetric analysis (TGA) of the precursors or oxide nanoparticles for the carbon and oxygen contributions.

However, in a preferred embodiment, the carbon and/or oxygen element may be introduced as a complement through a precursor made of at least one carbon compound added to the aqueous solution. This compound is chemically inert within the aquous solution with respect to the alkoxide, and in particular does not comprise any OH group(s) that may cause alkoxide hydrolysis: it may therefore be selected from the group consisting of cellulose derivatives satisfying such criteria.

For example, it is preferably methylcellulose.

The process according to the present invention is therefore flexible in that it allows oxide nanoparticles to be produced with a wide variety of amorphous carbon/transition metal oxide molar ratios, and therefore oxide nanoparticles in which the transition metal oxide has a a wide range of coating ratios with amorphous carbon. This ratio is preferably in the range between 1 and 4, and more preferably, between 2 and 3.

According to a preferred embodiment, the excess acetic acid in the aqueous solution of the present invention is such that the molar ratio between the amount of acetic acid, the amount of alcohol and the amount of alkoxide is in the range between 20:6:1 and 3:1:1, and still more preferably, is equal to 16:4:1. It has also been found that such a molar ratio further enables the increase in viscosity to be limited after addition, if appropriate, of a carbon compound according to the present invention.

Preferably, the aqueous solution of the present invention has a pH in the range between 3 and 10 and more preferably, in the range between 3 and 5, to avoid excessive lowering of its freezing point, thereby promoting its lyophilization.

DETAILED DESCRIPTION OF THE INVENTION

Further objects, features and advantages of the invention will become more apparent from the following description, which is non-limitative and given for the purpose of illustration.

The following examples illustrate, according to the present invention, the process for manufacturing nanoparticles of a dioxide of various transition metals with different coating rates, followed by the use of such nanoparticles in order to obtain the corresponding carbides.

1—Manufacture of Coated Titanium Dioxide ($TiO_2$) Nanoparticles with a Carbon/$TiO_2$ Molar Ratio of Approximately 3.

A volume of 2.27 ml of titanium isopropoxide (IsopTi) corresponding to 0.59 g of $TiO_2$ was added to 2.27 ml of isopropanol (2-propanol) and 6.81 ml of glacial acetic acid (100%). The molar ratios of 16 (acid)/4 (alcohol)/1 (isopropoxide) and volume ratios of 3 (acid)/1 (alcohol)/1 (isopropoxide) were thus achieved. To this liquid mixture was added 200 ml of an aqueous solution in which had previously been dissolved 1.0790 g of methylcellulose (MC), corresponding to 0.1802 g of carbon (after prior TGA verification).

The obtained solution was clear, thus demonstrating that there was no significant formation of a sol and that the composition was homogeneous. It was then diluted in water in order to obtain 600 ml of an aqueous solution concentrated to 0.03 mole/l of Ti.

This aqueous solution was then nebulized (nebulizer available from Spraying Systems Emani Co., with a nozzle diameter of 0.51 mm) so as to form droplets with a mean size of 1 μm projected into liquid nitrogen in order to obtain corresponding ice particles.

These particles were introduced into a freeze dryer (commercially available Alpha 2-4 Christ LSC freeze dryer) at liquid nitrogen temperature. The pressure in the freeze dryer enclosure was then reduced to 0.1 Pa and the freeze dryer enclosure was maintained at this reduced pressure and at −20° C. for 48 hours. The enclosure was then heated to +30° C. for 3 hours while maintaining the pressure at 0.1 Pa.

By maintaining this low pressure at −20° C. for 48 hours and at +30° C. for 3 hours, water removal was induced through sublimation and then desorption, whereby 16 g of particles were obtained after this treatment in the form of a dry powder.

The dry powder (lyophilizate) obtained in the previous step was placed in a graphite boat and pyrolyzed in a tubular oven made of alumina (Adamel) under a flow of argon U (Arcal, flow of 1.2 l/min) by means of a temperature increase at a rate of 5° C./min, until reaching 450° C., which was maintained at this value for 0.1 hour, and then decreasing at a rate of 5° C./min down to room temperature. At the end of this pyrolysis, a black powder was obtained. X ray diffraction (XRD) and scanning electron microscopy (SEM) analyses of this powder show that it is made of nanoparticles of titanium dioxide $TiO_2$ with a tetragonal structure (also known as anatase) in the form of nanocrystallites having a mean size of 16 nm. The presence of a carbon coating on these nanoparticles was quantified by TGA under air. With the used proportions of IsopTi, alcohol, acetic acid and MC, the achieved carbon/$TiO_2$ molar ratio was thus 3.04; given that the ideal carbon/$TiO_2$ molar ratio is 3 to obtain the complete reduction of titanium dioxide according to the following carbothermal reduction reaction:

$$TiO_2(s) + 3C(s) \rightarrow TiC(s) + 2CO(g)$$

2—Manufacture of Titanium Carbide TiC Nanocrystallites.

The lyophilizate resulting from the lyophilization step and placed in a graphite boat was subjected to a thermal treatment in the above-mentioned alumina tubular oven (Adamel) under an argon flow while increasing the temperature at a rate of 5° C./min up to a temperature of 1300° C., which was maintained for 2 hours, and was then decreased at a rate of 5° C./min down to room temperature. In this case, the carbothermal reduction is carried out in continuity with the pyrolysis, which resulted in the formation of oxide nanoparticles: the lyophilizate was thus subjected to only one thermal treatment. This results in the formation of nanometer-sized titanium carbide TiC with a face-centered cubic structure having a lattice parameter of 4.326 Å (very close to the theoretical value of 4.327 Å), and a mean crystallite size of 65 nm, as determined by XRD and SEM analyses.

A TGA measurement made it possible to determine the stoechiometric composition of TiC and showed that the residual content of oxygen was less than 1% by weight and that an excess of carbon was present (as shown by a weight gain of 13.40% instead of the theoretical value of 33.40%). The knowledge of the value of this excess of carbon, considered to be an impurity, may help readjust the amount of carbon introduced through methylcellulose, possibly by means of repeated trials, in order to reduce or even eliminate the carbon content of the transition metal carbide.

3—Manufacture of Coated Titanium Dioxide ($TiO_2$) Nanoparticles in which the Carbon/$TiO_2$ Molar Ratio is 0.05.

Coated titanium dioxide ($TiO_2$) nanoparticles in which the carbon/$TiO_2$ molar ratio is 0.05 were manufactured according to a procedure similar to that of Example 1, except that the introduced amounts of elementary carbon were adapted. Such nanoparticles may in particular find an application as a component material for electrodes in lithium batteries. Their coating ratio is generally such that the carbon/$TiO_2$ molar ratio lies in the range between 0.01 and 0.06, preferably between 0.02 and 0.05.

4—Manufacture of Coated Zirconium Dioxide ($ZrO_2$) or Hafnium Dioxide ($HfO_2$) Nanoparticles and of Zirconium and Hafnium Carbides.

Zirconium dioxide ($ZrO_2$) nanoparticles and hafnium dioxide ($HfO_2$) nanoparticles both coated with amorphous carbon were manufactured under conditions similar to those of the previous examples.

The same procedure was used for the carbothermal reduction itself: a lyophilizate obtained under conditions similar to those of the previous examples was subjected to thermal treatment at 1400° C. for 3 hours and 5 hours, respectively, to produce ZrC and HfC crystallites having a mean size of 40 nm and 30 nm, respectively.

The conditions under which the transition metal carbide can be obtained from the oxide nanoparticles which form at approximately 450° C. during the temperature rise leading to the carbothermal reduction may however vary slightly according to the transition metal of interest. These generally comprise a temperature increase at a rate in the range between 5° C./min and 10° C./min, preferably 5° C./min, up to a temperature in the range between 1000° C. and 1600° C., preferably 1300° C. or 1400° C., which temperature is maintained for a duration of 2 to 6 hours, preferably 2 hours for TiC, 3 hours for ZrC and 5 hours for HfC.

One skilled in the art will be able to fine tune these conditions through repeated trials in order to achieve the most complete carbothermal reduction possible and the smallest mean size possible for nanocrystallites, which may range, according to the present invention, between 30 and 100 nm, preferably between 30 and 70 nm, and still more preferably between 30 and 40 nm.

Advantageously, the carbothermal reduction is carried out with a carrier gas comprising argon and more advantageously, argon U or Arcal.

The above examples pertain to the manufacture of oxide and carbide nanoparticles comprising titanium, zirconium and hafnium. Based on their general knowledge, those skilled in the art can easily adapt these to other transition metals such as vanadium, niobium and tantalum.

From the foregoing description, it may be understood that the process of the present invention allows oxide nanoparticles to be manufactured with a reduced mean size, which makes it possible to produce, after carbothermal reduction at a moderate temperature, nanocrystallites of transition metal carbides having a higher degree of purity and/or a smaller mean size than the nanoparticles presently produced by sol-gel type processes. This process is also straightforward to implement and, in particular, allows easy production of oxide nanoparticles in which the transition metal oxide has a wide variety of amorphous carbon coating ratios.

The invention claimed is:

1. A process for manufacturing nanoparticles of at least one oxide of a transition metal selected from the group consisting of Ti, Zr, Hf, V, Nb and Ta, which are coated with amorphous carbon, said process comprising the following consecutive steps:
   (i) preparing a liquid mixture containing as precursors at least one alkoxide of said transition metal, an alcohol, acetic acid in excess with respect to said transition metal, and then diluting the mixture in water so as to form an aqueous solution, said precursors being present in said aqueous solution in a molar ratio so as to prevent or restrict the formation of a sol so that said aqueous solution can be lyophilized, and such that said transition metal, the carbon and the oxygen are present in the aqueous solution in the same stoichiometric ratio in which they are found in said nanoparticles,
   (ii) subjecting said aqueous solution to lyophilization,
   (iii) pyrolyzing the lyophilizate obtained in the previous step, under vacuum or an inert atmosphere to obtain said nanoparticles.

2. The process for manufacturing nanoparticles according to claim 1, wherein said molar ratio is adjusted by adding to the aqueous solution at least one carbon compound chemically inert with respect to the alkoxide.

3. The process for manufacturing nanoparticles according to claim 2, wherein said carbon compound is a cellulose derivative.

4. The process for manufacturing nanoparticles according to claim 1, wherein said alkoxide is selected from the group consisting of isopropoxide and n-propoxide.

5. The process for manufacturing nanoparticles according to claim 1, wherein said alcohol is selected from the group consisting of 1-propanol and 2-propanol.

6. The process for manufacturing nanoparticles according to claim 1, wherein the concentration of the transition metal in the aqueous solution is 0.1 mole/l or less.

7. The process for manufacturing nanoparticles according to claim 1, wherein the molar ratio between the amount of acetic acid, the amount of alcohol and the amount of alkoxide is in the range between 20:6:1 and 3:1:1.

8. The process for manufacturing nanoparticles according to claim 1, wherein said lyophilization is carried out between −200° C. and +50° C. and at a pressure in the range between 0.1 Pa and 100 Pa.

9. The process for manufacturing nanoparticles according to claim 8, wherein said lyophilization comprises a step of removing the adsorbed water, which consists in maintaining the lyophilizate under the lyophilization pressure, and then increasing the temperature up to a value which lies in the range between 30° C. and 100° C.

10. The process for manufacturing nanoparticles according to claim 1, wherein, during step (iii), the lyophilizate is pyrolyzed at a temperature in the range between 400° C. and 900° C.

11. The process for manufacturing nanoparticles according to claim 1, wherein the mean size of said nanoparticles is in the range between 10 and 100 nm.

12. An application of the manufacturing process according to claim 1, for obtaining a carbide of said transition metal in the form of nanocrystallites, further comprising subjecting said nanoparticles to carbothermal reduction at a later stage or in continuity with said process.

13. The application according to claim 12, wherein said nanocrystallites have a mean size in the range between 30 and 100 nm.

14. The application according to claim 12, wherein said carbothermal reduction comprises increasing the temperature at a rate in the range between 5 and 10° C./min up to a temperature in the range between 1000° C. and 1600° C. which is maintained for a duration in the range between 2 and 6 hours.

15. The application according to claim 12, wherein said carbothermal reduction is carried out in the presence of a carrier gas comprising argon.

16. The process of claim 3, wherein the cellulose derivative is methocellulose.

17. The process of claim 1, wherein the concentration of the transition metal in the aqueous solution is in the range between a 0.01 and 0.1 mole/l;
  the molar ratio between the amount of acetic acid, the amount of alcohol and the amount of alkoxide is 16:4:1;
  the lyophilization is carried out between C−20° and C+30°, at a pressure less than 10 Pa;
  and, during step (iii), the lyophilizate is pyrolyzed at a temperature between 400° C. and 900° C.

18. The process of claim 1, wherein said nanoparticles are produced in a mean size range between 10 and 20 mm.

* * * * *